United States Patent
Takahashi

(10) Patent No.: US 7,106,324 B1
(45) Date of Patent: Sep. 12, 2006

(54) IMAGE GENERATING SYSTEM AND PROGRAM

(75) Inventor: Kazuya Takahashi, Ota-ku (JP)

(73) Assignee: Namco Ltd., Tokyo (JP)

( * ) Notice: Subject to any disclaimer, the term of this patent is extended or adjusted under 35 U.S.C. 154(b) by 344 days.

(21) Appl. No.: 09/830,356

(22) PCT Filed: Sep. 1, 2000

(86) PCT No.: PCT/JP00/05955

§ 371 (c)(1),
(2), (4) Date: Jun. 4, 2001

(30) Foreign Application Priority Data

Sep. 9, 1999 (JP) ................................ 11-256199

(51) Int. Cl.
*G06T 15/30* (2006.01)

(52) U.S. Cl. ..................................................... 345/423

(58) Field of Classification Search ................ 345/620, 345/623, 419, 423, 418, 619
See application file for complete search history.

(56) References Cited

U.S. PATENT DOCUMENTS

| | | | | |
|---|---|---|---|---|
| 3,816,726 A | * | 6/1974 | Sutherland et al. ......... | 345/623 |
| 5,734,808 A | * | 3/1998 | Takeda ........................ | 345/419 |
| 5,757,321 A | * | 5/1998 | Billyard ...................... | 345/426 |
| 5,777,625 A | * | 7/1998 | Rossin ........................ | 345/620 |
| 5,986,669 A | * | 11/1999 | Kirkland ...................... | 345/620 |
| 6,052,129 A | * | 4/2000 | Fowler et al. .............. | 345/620 |
| 6,239,808 B1 | * | 5/2001 | Kirk et al. ................... | 345/582 |
| 6,507,348 B1 | * | 1/2003 | Mang et al. ................. | 345/622 |

FOREIGN PATENT DOCUMENTS

| | | |
|---|---|---|
| EP | 0 132 573 A2 | 2/1985 |
| JP | 60-3695 A | 1/1985 |

* cited by examiner

*Primary Examiner*—Don Wong
*Assistant Examiner*—Huedung X. Cao
(74) *Attorney, Agent, or Firm*—Oliff & Berridge, PLC

(57) ABSTRACT

An image generating system and a program enabling scissoring of a polygon in a three-dimensional stage to prevent display failure of a polygon on a screen end or at a short distance from the viewpoint with a reduced computation load. The system performs scissoring processing for a polygon in a three-dimensional stage and generates an image of an object including a new vertex generated by the scissoring. A polygon which is at a short distance from a view point, displaying of which is likely to be missed, is scissored on side surfaces of a quadrangular pyramid forming a view volume, to prevent the display failure of the polygon existing at a short distance from the end of a screen. A polygon arranged in the three-dimensional space is subjected to coordinate transformation into a screen coordinate system, to detect an undrawable vertex, and a polygon containing the detected vertex is scissored at a portion containing the detected vertex, in a predetermined plane.

18 Claims, 18 Drawing Sheets

410 SCISSORING PLANE
400 POLYGON 400
410
POSITIVE Z-COORDINATE (WITHIN THE RANGE)
NEGATIVE Z-COORDINATE (OUT OF THE RANGE)

FIG. 15
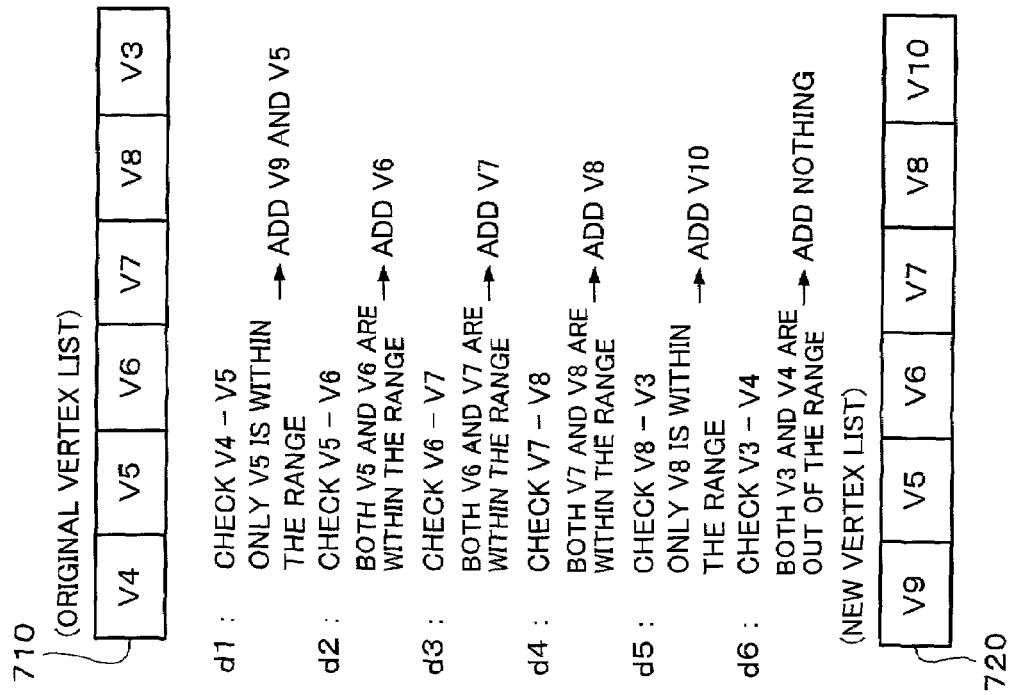
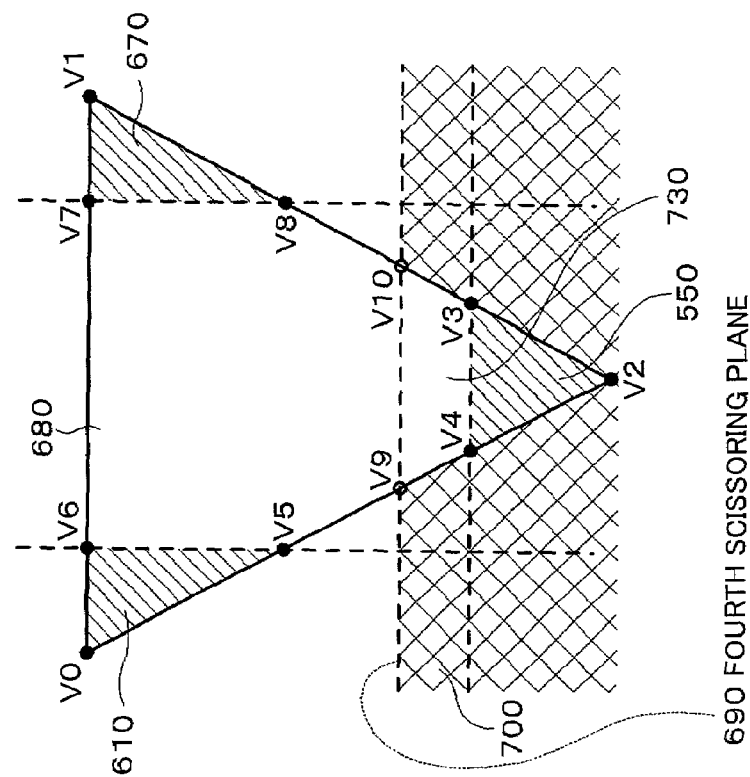

IMAGE GENERATING SYSTEM AND PROGRAM

TECHNICAL FIELD

The present invention relates to an image generating system and a program.

BACKGROUND ART

In the prior art, there has been known an image generating system for generating an image which can be seen from a given view point in an object space or a virtual three-dimensional space. This image generating system is highly popular because it allows the so-called "virtual reality" to be experienced. In the image generating system capable of enjoying the racing game, for example, the player enjoys the three-dimensional game by manipulating a racing car (or object) to run in the object space so that the car may compete with another racing car manipulated by another player or a computer.

In this image generating system, it is an important technical target for improving the virtual reality of the player to generate a more real image.

Generally in the image generation, the polygon coordinates existing in the three-dimensional space are perspectively projected and transformed into a screen coordinate system and are then written in a frame buffer. At this time, in the case of a vertex of a polygon existing on a screen end at a short distance from the viewpoint, the Z-value is approximate 0 so that the perspectively transformed value exceeds a predetermined range. As a result, the polygon is not written in the frame buffer to cause a trouble that the image is formed to have the polygon omitted. If the polygon is especially large, there arises a problem that the display failure is conspicuous.

As one method for eliminating this problem, there is a method for reducing or making the display failure inconspicuous by dividing the polygon into a plurality of smaller polygons. However, this method is troubled by a problem that the vertex, as should be located at the same position after the division, is shifted at the time of interpolating two vertex coordinates to generate a gap.

DISCLOSURE OF THE INVENTION

The present invention was devised in view of those problems in the prior art and has as an object thereof the provision of an image generating system and a program which enable scissoring of a polygon in a three-dimensional stage with a reduced processing load, to prevent display failure of a polygon on a screen end or at a short distance from the viewpoint.

(1) According to the present invention, there is provided an image generating system which generates a three-dimensional image of an object formed of a polygon, comprising:
means which scissors a polygon arranged in a three-dimensional space in an arbitrary plane to generate a new vertex for specifying the scissored polygon; and
means which generates an image of an object formed of a polygon containing the new vertex.

A computer-usable program according to the present invention is a program embodied on an information storage medium or in a carrier wave, comprising information (or program) for implementing (or executing) the above-described means. The computer-usable program according to the present invention comprises a module for implementing (or executing) the above-described means.

According to the present invention, a polygon can be scissored at a three-dimensional state so that an image of an object containing a vertex generated newly by the scissoring can be generated.

Therefore, the display failure of a polygon can be prevented by scissoring a large polygon existing on the screen end at a short distance from the viewpoint, in a proper plane.

The scissoring is also effective for generating the scissored object.

(2) In the image generating system or the program embodied on an information storage medium or in a carrier wave according to the present invention, a polygon containing a vertex which is out of a drawable range may be scissored at a portion containing the vertex, in a predetermined plane.

A vertex which is out of a drawable range can include a vertex which has a perspectively transformed coordinates that exceeds a predetermined range so that it is not written in a frame buffer. Such vertex is frequently contained in a polygon on a screen end at a short distance from the viewpoint. If such polygon has a large size, the display failure is conspicuous. Thus, there is a technique for reducing the display failure or making the display failure inconspicuous by dividing a large polygon into a plurality of small polygons.

Although there is a method of generating an image by dividing a large polygon, that method has a problem in that a difference is created between positions of a vertex before and after the division, in the interpolation of the two vertices coordinates.

According to the present invention, however, such a problem can be eliminated by scissoring a portion containing the troublesome vertex in a predetermined plane, so that the display failure of a polygon can be prevented. Even when an object is in the vicinity of the screen end, a satisfactory image can be generated.

Note that the predetermined plane is preferably a plane capable of eliminating the troublesome portion.

(3) In the image generating system or the program embodied on an information storage medium or in a carrier wave according to the present invention, a polygon may be scissored in a plane which specifies a viewing angle range.

A plane which specifies a viewing angle range is a plane which forms a view volume, for example. If the view volume is a quadrangular pyramid having a view point as a vertex, the scissoring computation can be efficiently performed by scissoring a polygon in the three-dimensional space at four side surfaces excepting a bottom surface.

According to the present invention, the display failure of a polygon at the end of the view field can be well prevented by scissoring the polygon in a plane which specifies a viewing angle range. At the same time, the cut ends can be out of the display screen, enabling to generate a more proper image.

(4) In the image generating system or the program embodied on an information storage medium or in a carrier wave,
a polygon arranged in a three-dimensional space may be subjected to coordinate transformation into a screen coordinate system, to detect an undrawable vertex; and
the polygon containing the detected vertex may be scissored at a portion containing the detected vertex in a predetermined plane.

When coordinates of a polygon in the three-dimensional space is out of a predetermined range after the coordinate transformation, the display failure is apt to be caused. According to the present invention, such a vertex is detected by performing the coordinate transformations in advance, and the scissoring processing is performed for only a portion of the polygon containing the detected vertex in an arbitrary plane. As a result, the computation load can be greatly reduced in comparison with the case in which all the polygons are scissored in an arbitrary plane. Therefore, the present invention is effective especially in the real time image generation by hardware with a low processing ability.

BRIEF DESCRIPTION OF THE DRAWINGS

FIG. 15 is a diagram for illustrating the generation of a new vertex by scissoring a hexagon created by the preceding scissoring in the first, second and third scissoring planes, in a fourth scissoring plane.

BEST MODE FOR CARRYING OUT THE INVENTION

A preferred embodiment of the invention will be described with reference to the drawings. Note that the present invention will be described on the case in which it is applied to a racing game, but should not be limited thereto but could be applied to various other games.

1. Configuration

Figure 1:
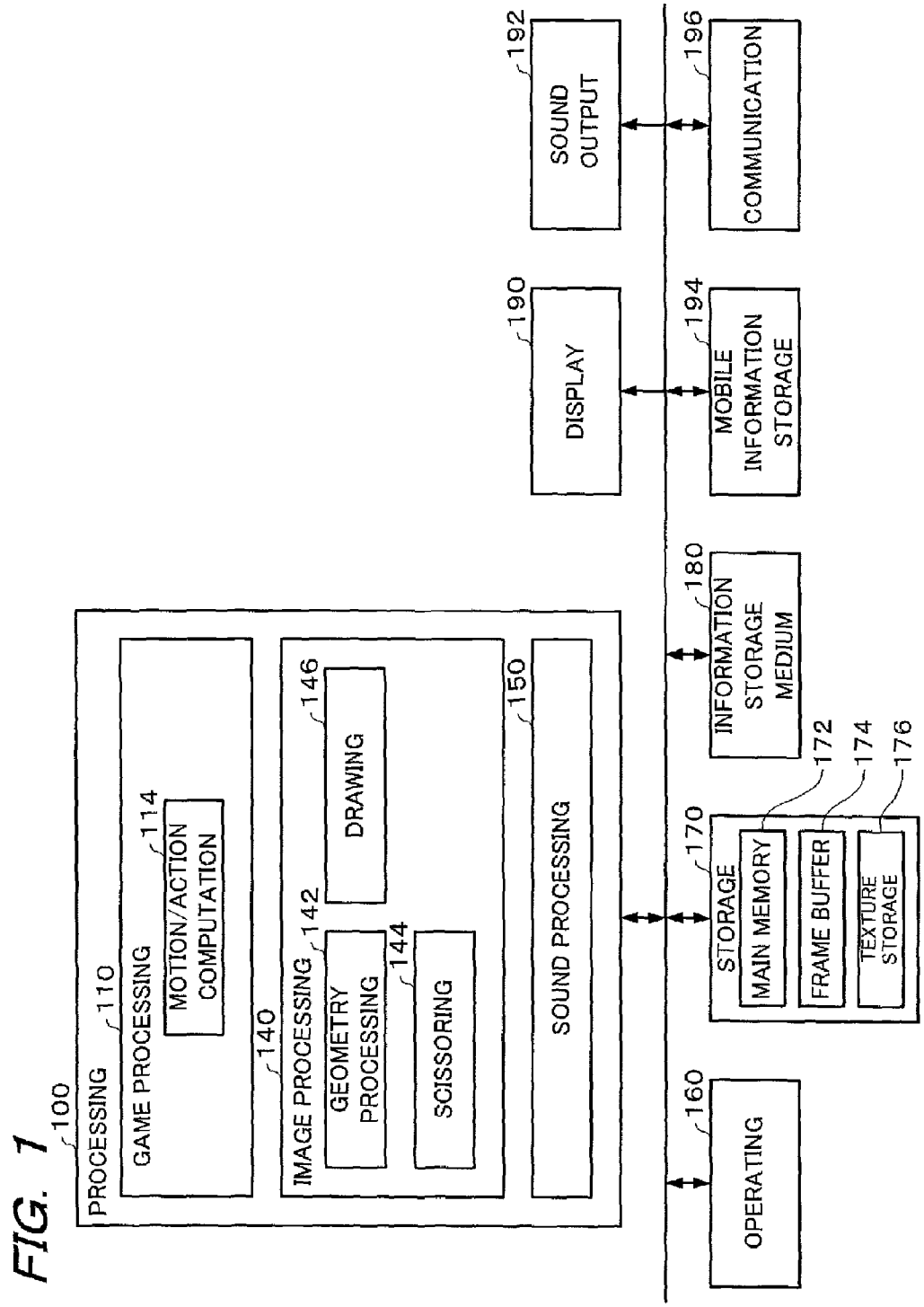
FIG. 1 is an example of a block diagram of an image generating system of one embodiment of the present invention.

FIG. 1 shows one example of a block diagram of the embodiment. Here in FIG. 1, the embodiment may include at least a processing section 100 (or the processing section 100 and a storage section 170, or the processing section 100, the storage section 170 and an information storage medium 180), and the remaining blocks (e.g., an operating section 160, a display section 190, a sound output section 192, a portable information storage section 194 and a communication section 196) may be arbitrary components.

The processing section 100 executes various types of processing including a control of the entire system, an indication of an instruction to each block in the system, a game processing, an image processing and a sound processing, and its functions can be implemented by various processors (e.g., CPU or DSP), a hardware such as ASIC (or a gate array) or a given program (e.g., a game program).

The operating section 160 is provided for the player to input operating data, and its functions can be implemented by a hardware including a lever, buttons and a casing.

The storage section 170 provides a work area for the processing section 100 and the communication section 196, and its functions can be implemented by a hardware such as a RAM.

The information storage medium 180 (i.e., a storage medium to be used by a computer) stores information such as programs or data, and its functions can be implemented by a hardware such as an optical disk (e.g., CD or DVD), a magneto-optic disk (MO), a magnetic disk, a hard disk, a magnetic tape or a memory (ROM). The processing section 100 executes various types of processing of the present invention (or the present embodiment) on the basis of the information stored in the information storage medium 180. In short, the information storage medium 180 is stored with the information (i.e., the programs, or the programs and the data) for executing the means (i.e., the blocks contained in the processing section 100) of the invention (or the embodiment).

The information stored in the information storage medium 180 is partially or wholly transferred to the storage section 170 when the power to the system is turned on. The information stored in the information storage medium 180 contain at least one of the program codes, image data, sound data, shape data of an object to be displayed, table data and list data, information for indicating the processing of the invention, and information for the processing according to the indication.

The display section 190 outputs the image which is generated by the embodiment, and its functions can be implemented by a hardware such as a CRT, LCD or HMD (Head Mount Display).

The sound output section 192 outputs the sound which is generated by the embodiment, and its functions can be implemented by a hardware such as a speaker.

The portable information storage section 194 is provided for storing the personal data of the player or the save data and can be exemplified by a memory card or a portable game device.

The communication section 196 makes various controls for communications with the outside (e.g., a host machine or other image generating system), and its functions can be implemented by a hardware such as various processors or communication ASIC, or programs.

The programs or data for executing the means of the invention (or the embodiment) may be distributed from the information storage medium owned by the host machine (or server) through the network and the communication section 196 to the information storage medium 180. This use of the information storage medium of the host machine (or server) is contained within the scope of the invention.

The processing section 100 includes a game processing section 110, an image processing section 140 and a sound processing section 150.

The game processing section 110 executes game processing such as the processing of receiving coins (or fee), the processing of setting the various modes, the processing of progressing the game, the processing of setting a selected screen, the processing of determining the position or angles of rotation (those on X-, Y- or Z-axis) of the object, the processing (or motion processing) of moving the object, the processing of determining the position of a view point or a line angle of sight (or a visual direction), the processing of arranging the object such as a map object in the object space, the hit checking processing, the processing of computing the game result (e.g., fruit or score), the processing for a plurality of players to play in a common game space, or the game-over processing, on the basis of the operating data from the operating section 160, the personal data or stored data from the portable information storage section 194, or the game programs.

The image processing section 140 executes image processing in accordance with indications or the like from the game processing section 110. The sound processing section 150 executes sound processing in accordance with indications or the like from the game processing section 110.

The functions of the image processing section 140 and the sound processing section 150 may be implemented wholly by the hardware or the programs. Alternatively, the functions may be implemented by both of the hardware and the programs.

The game processing section 110 includes a motion/action computation section 114.

This motion/action computation section 114 computes motion information (e.g., the position data or the angle data of rotation) of the object such as a car, or action information (e.g., the position data or the angle data of rotation of each part of the object), and executes the processing to move the object or to cause the same to act on the basis of the operating data or the game programs, as inputted by the player from the operating section 160, for example.

More specifically, the motion/action computation section 114 executes the processing to determine the position or the rotation angle of the object at each frame (1/60 sec.), for example. Let it be assumed that the object at a (k−1)-th frame has a position $PMk-1$, a velocity $VMk-1$, an acceleration $AMk-1$, and that one frame has a time $\Delta t$. Then, the position $PMk$ and the velocity $VMk$ of the object at the k-th frame are determined from the following Formulas:

$$PMk = PMk-1 + VMk-1 \times \Delta t \quad (1)$$

$$VMk = VMk-1 + AMk-1 \times \Delta t \quad (2)$$

The image processing section 140 includes a geometry processing section (or a three-dimensional coordinate computation section) 142, a scissoring section 144 and a drawing section (or rendering section) 146.

The geometry processing section 142 executes geometry processing (or three-dimensional coordinate computations) such as the coordinate transformation, the clipping processing, the perspective transformation or the light source calculation. In the embodiment, moreover, the object data (e.g., the vertex position of the object, the vertex texture coordinates, the luminance data or the normal vector) after geometry-processed (or perspectively transformed) are stored and retained in a main memory 172 of the storage section 170.

The scissoring section 144 scissors a polygon, as arranged in the three-dimensional space, in an arbitrary plane, and undergoes processing to generate a new vertex for specifying the scissored polygon.

A polygon containing the vertex, which is not confined in a drawable range, may be scissored at a portion containing the vertex in a predetermined plane. The polygon may be scissored in a plane specifying the viewing angle range. A polygon arranged in a three-dimensional space may be coordinate transformed into a screen coordinate system, and an undrawable vertex may be detected so that a polygon containing the detected vertex may be scissored at a portion containing the vertex in a predetermined plane.

The drawing section 146 draws an object on the basis of the object data after geometry-processed (or perspectively transformed) and the texture stored in a texture storage section 176. In the invention, the drawing section 146 draws the object with the object data scissored to be stored in the main memory 172. Thus, the polygon at the short distance from the viewpoint can be prevented with a low processing burden from failing to be displayed.

Here, the image forming system of the embodiment may be exemplified not only by a single player dedicated system for allowing only one player to play but also by a multi-player mode system for allowing a plurality of players to play.

When a plurality of players play a game, game images and sounds to be serviced to those players may be generated by using one terminal or a plurality of terminals connected through the network (or the transmission lines or the communication lines).

2. Features and Operations of the Embodiment

Here will be described the features and operations of the embodiment. The description will be made on the case in which the object is formed of a polygon.

A first feature of the embodiment resides in that the polygon is scissored at the three-dimensional stage so that an image of the object containing the vertex generated newly by the scissoring can be generated.

A second feature of the embodiment resides in that the polygon existing on a screen end at a short distance from the viewpoint is prevented by using the scissoring method from failing to be displayed.

Figure 2:
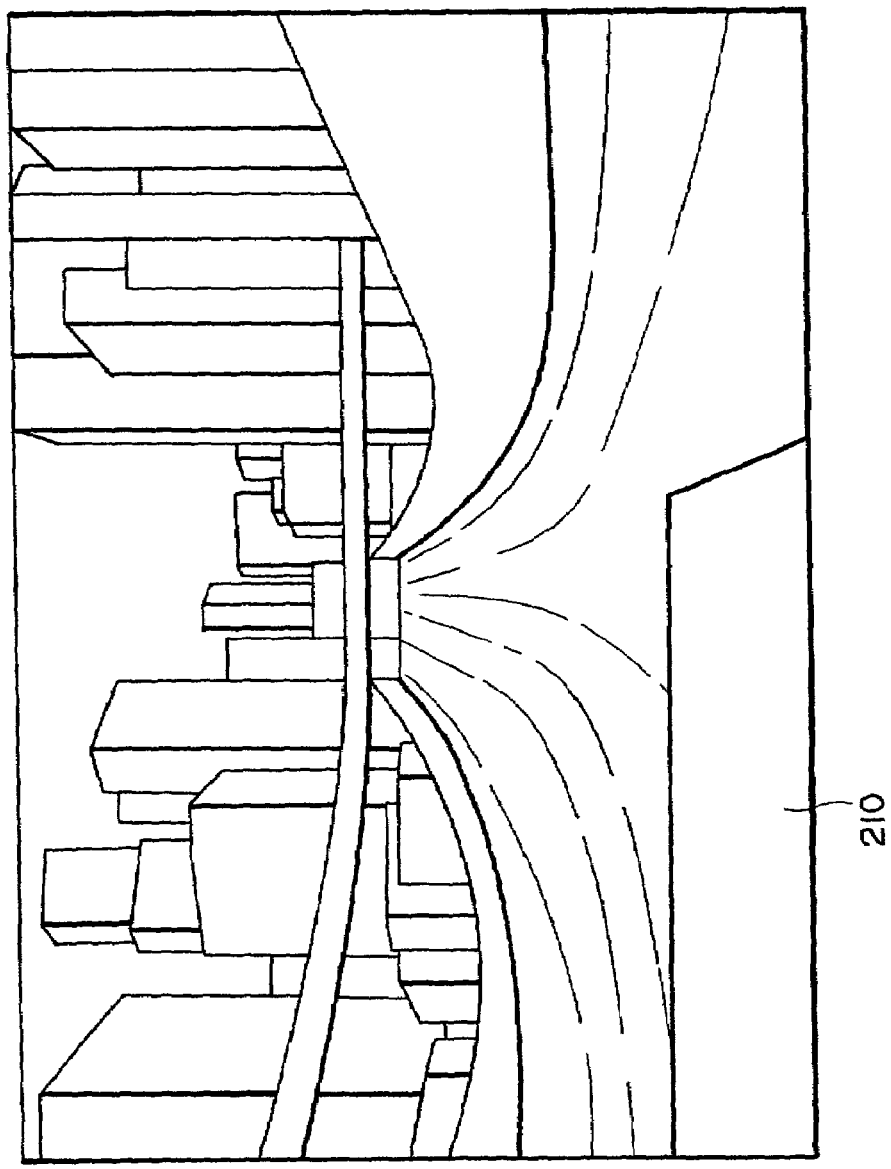
FIG. 2 is a view for illustrating an example of the display failure in a screen of a drive game.

FIG. 2 shows an example in which a failure in the display occurs in the display screen of a drive game. The display failure occurs at a portion 210 on a road at a short distance from the viewpoint.

This display failure is caused for preventing the value after the perspective transformation such as the polygon near the view point from being written over a predetermined range in the frame buffer.

Therefore, the display failure is liable to occur if the image of an object such as a road at a short distance from the viewpoint in the drive game or the like is generated. Moreover, the road or the like has such a large polygon every piece that its display failure is frequently conspicuous.

In the embodiment, therefore, the display failure of the polygon containing the vertex, the perspectively transformed value of which is not confined in the predetermined range, is prevented by scissoring the portion containing that vertex in a given plane to remove the portion containing the troublesome vertex.

Figure 3:
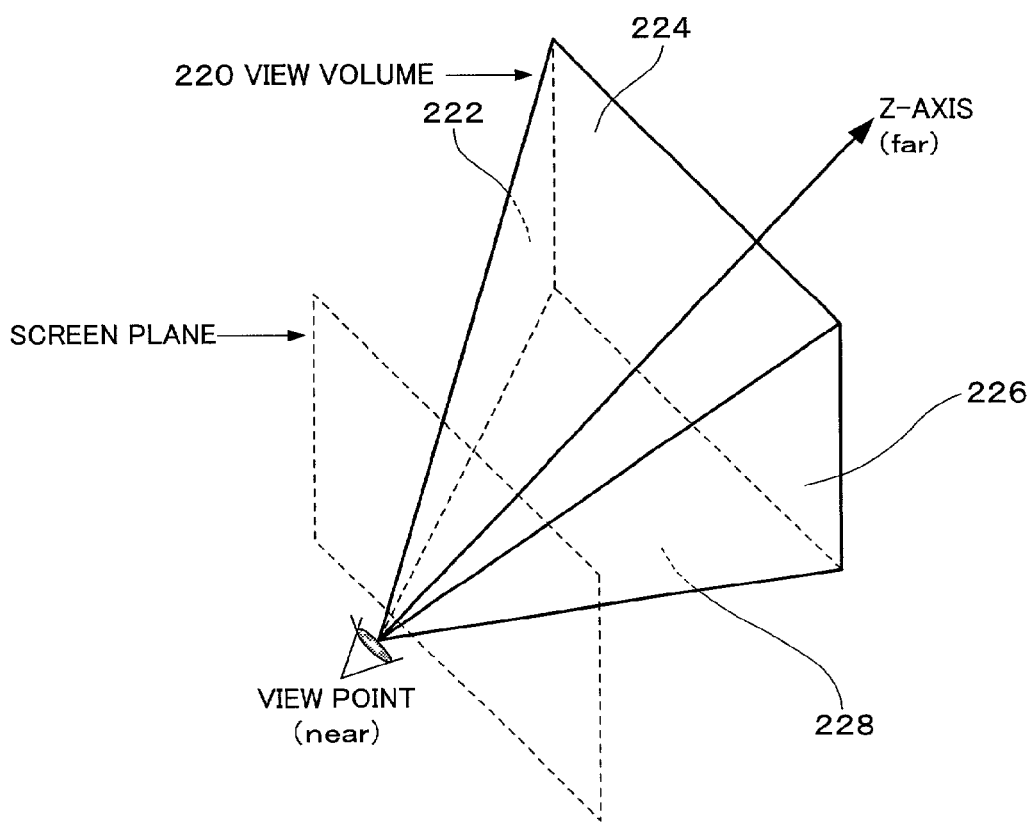
FIG. 3 is a diagram for illustrating a plane used for the scissoring processing in one embodiment of the present invention.

FIG. 3 is a diagram for describing a plane to be used for the scissoring processing in the embodiment. In the embodiment, this scissoring processing is executed by using the side faces 222, 224, 226 and 228 of a quadrangular pyramid composing a view volume 220.

By scissoring the side faces of the quadrangular pyramid composing the view volume, the portions other than the displayed portion can be scissored wholly and efficiently so that the cut ends may not appear on the display screen.

Moreover, a new vertex is generated in the cut-off portion, and a polygon containing the new vertex is perspectively transformed to execute the drawing processing.

Figure 4:
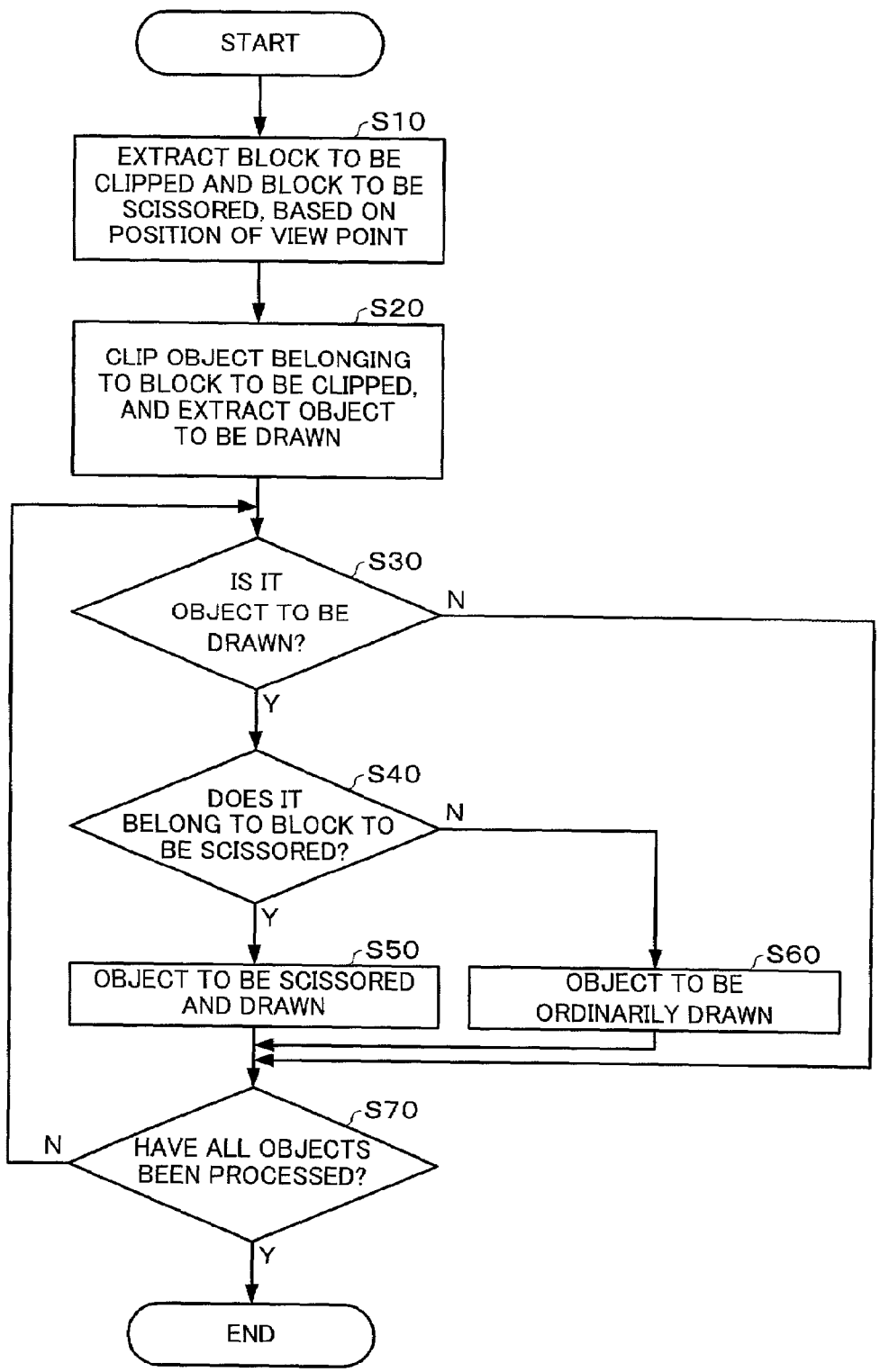
FIG. 4 is a flowchart of an example of the processing for extracting an object to be scissored in one embodiment of the present invention.
Figure 5:
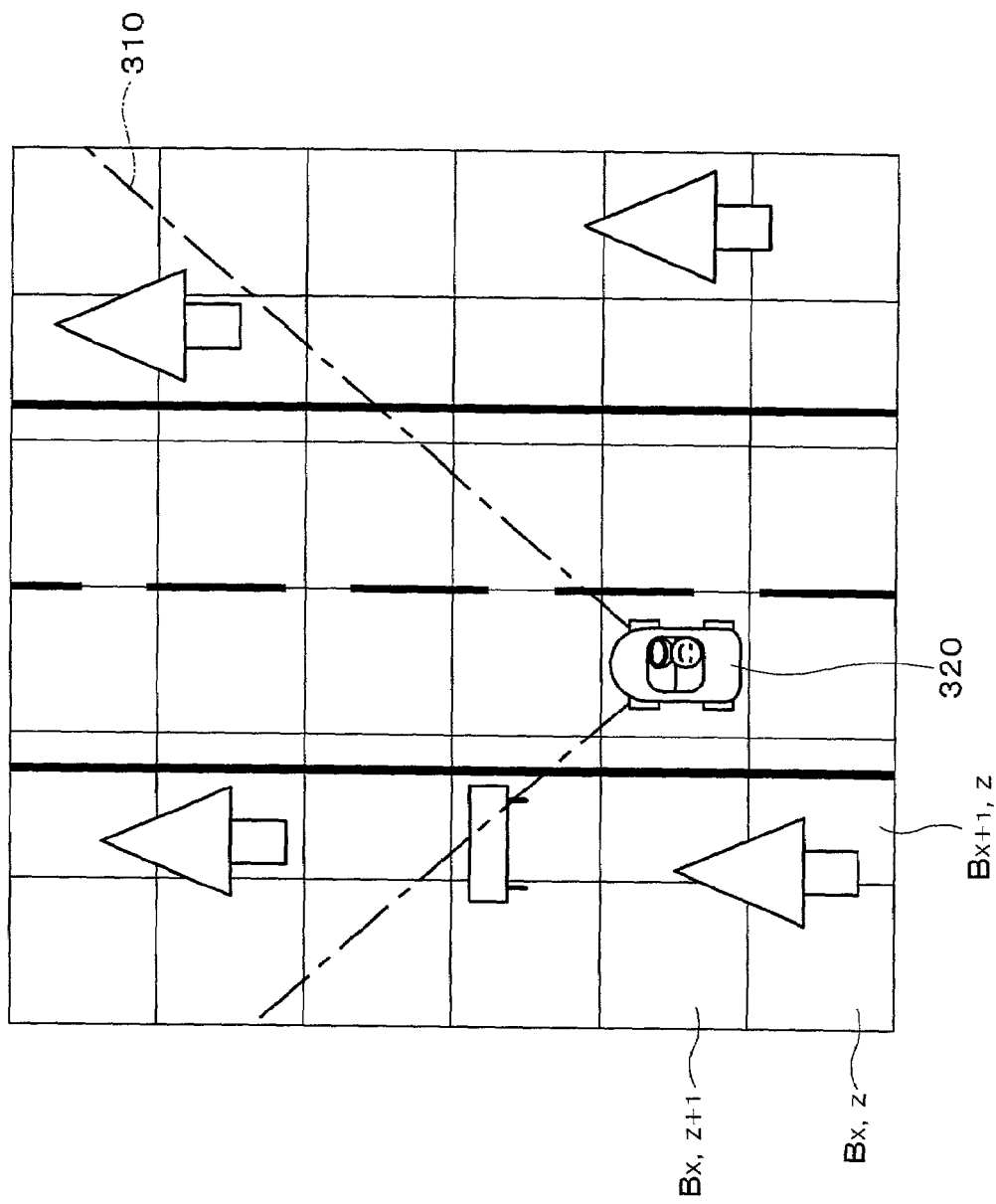
FIG. 5 is a diagram for illustrating a block to be clipped and a block to be scissored.
Figure 6:
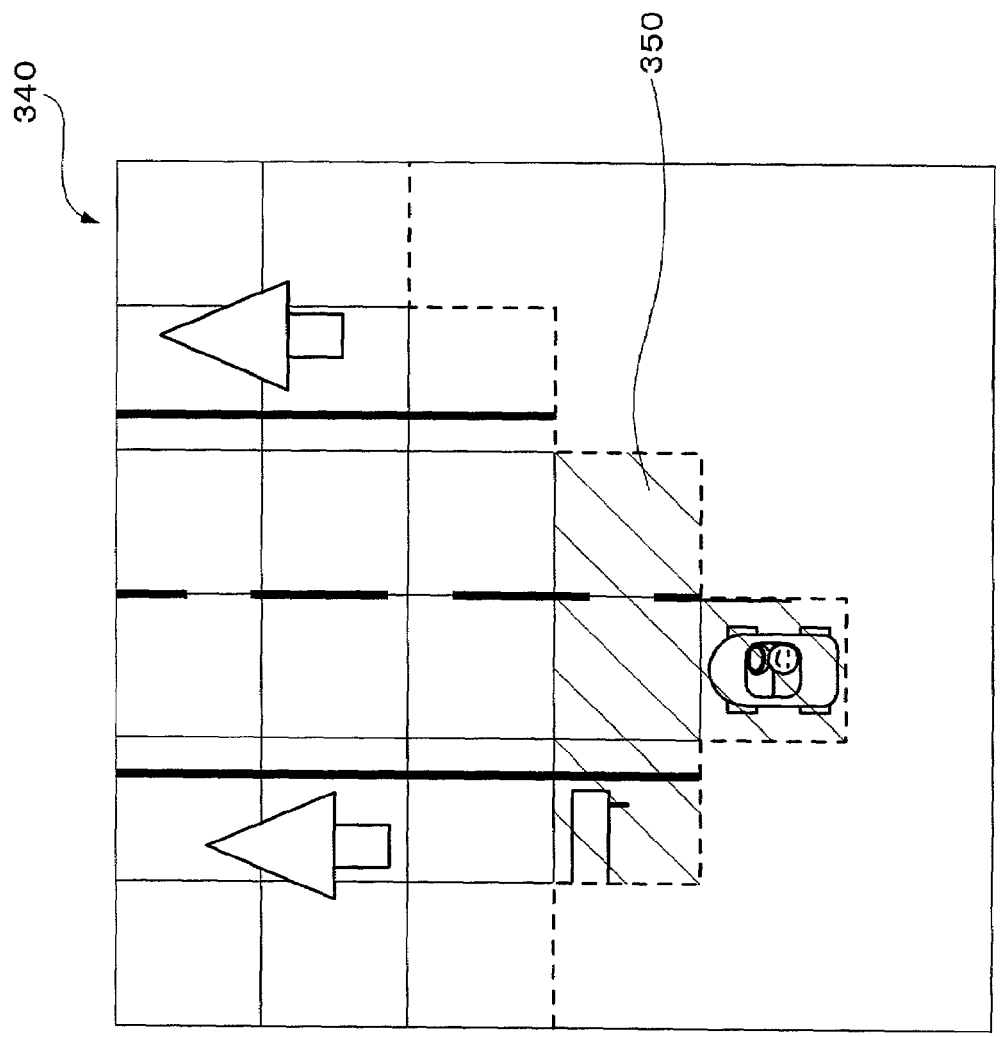
FIG. 6 is a diagram for illustrating a block to be clipped and a block to be scissored.

FIG. 4 is a chart for describing a processing example for extracting an object to be scissored in the embodiment. FIG. 5 and FIG. 6 are diagrams for describing a block to be clipped and a block to be scissored.

First of all, the block to be clipped and the block to be scissored are extracted on the basis of the view point (step S10).

In the embodiment, there are divided a plurality of blocks of lattice-shaped game fields $B_{x,z}$, $B_{x,z+1}$, $B_{x+1,z}$, ... and so on, as shown in FIG. 5. If the view point is located in the vicinity of a player car 320 and the viewing angle range is as shown by 310, a block in the viewing angle range is extracted at first (as shown in FIG. 6). Then, an object belonging to a block 340 within the viewing angle range is extracted as the object to be clipped. A polygon at a short distance from the viewpoint is to be prevented from the display failure so that four blocks (as hatched at 350 in FIG. 6) containing the view point are extracted to be scissored.

Then, objects belonging to the block to be clipped are clipped, and objects to be drawn are extracted (step S20).

At steps S30 to S70, the objects are classified into those to be ordinarily drawn and those to be scissored and drawn.

Of the objects to be drawn, more specifically, objects belonging to the block to be scissored are scissored and drawn (steps S30, S40 and S50). Of the objects to be drawn, objects failing to belong to the block to be scissored are ordinarily drawn (steps S30, S40 and S60). For all the objects, the processing of steps S30 to S70 is repeated till the objects are completed for classification.

Figure 7:
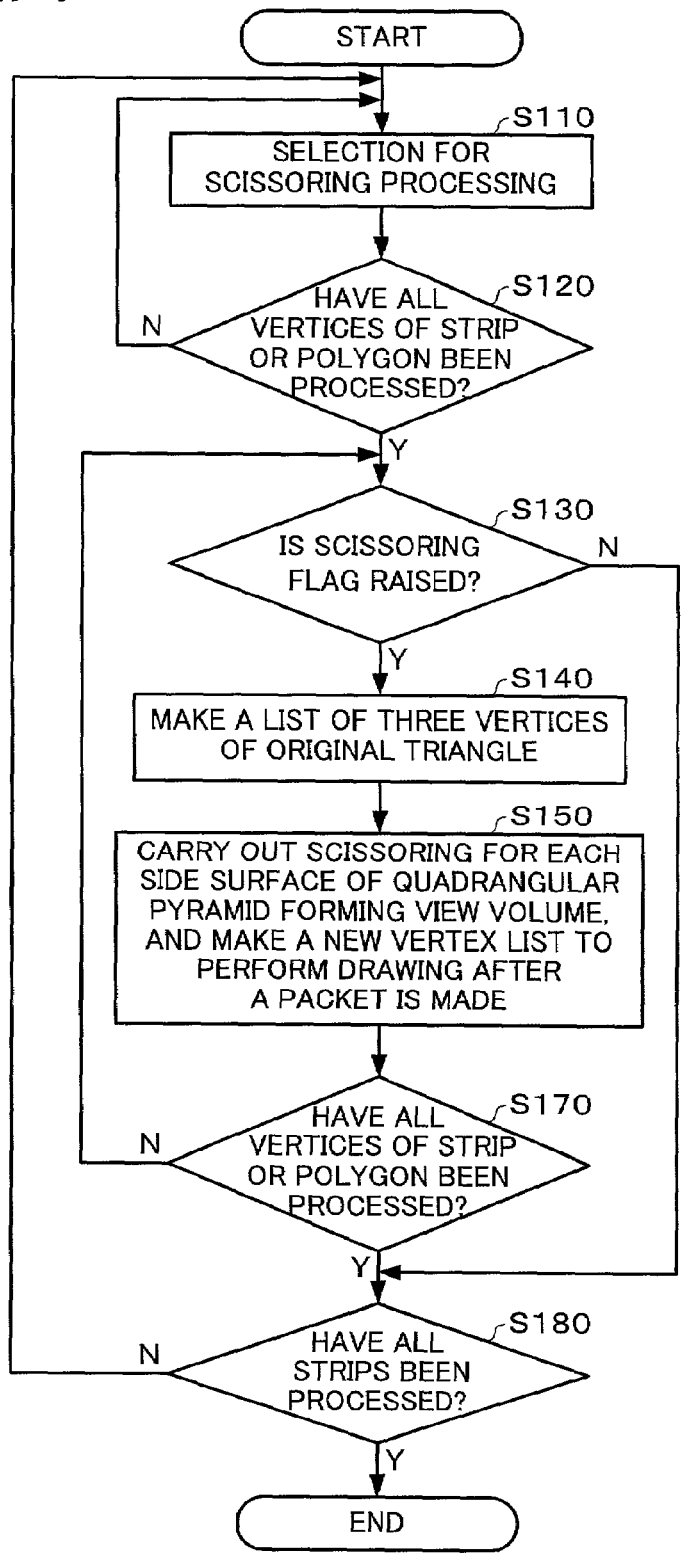
FIG. 7 is a flowchart of a concrete example of the processing for the scissoring and drawing.
Figure 8:
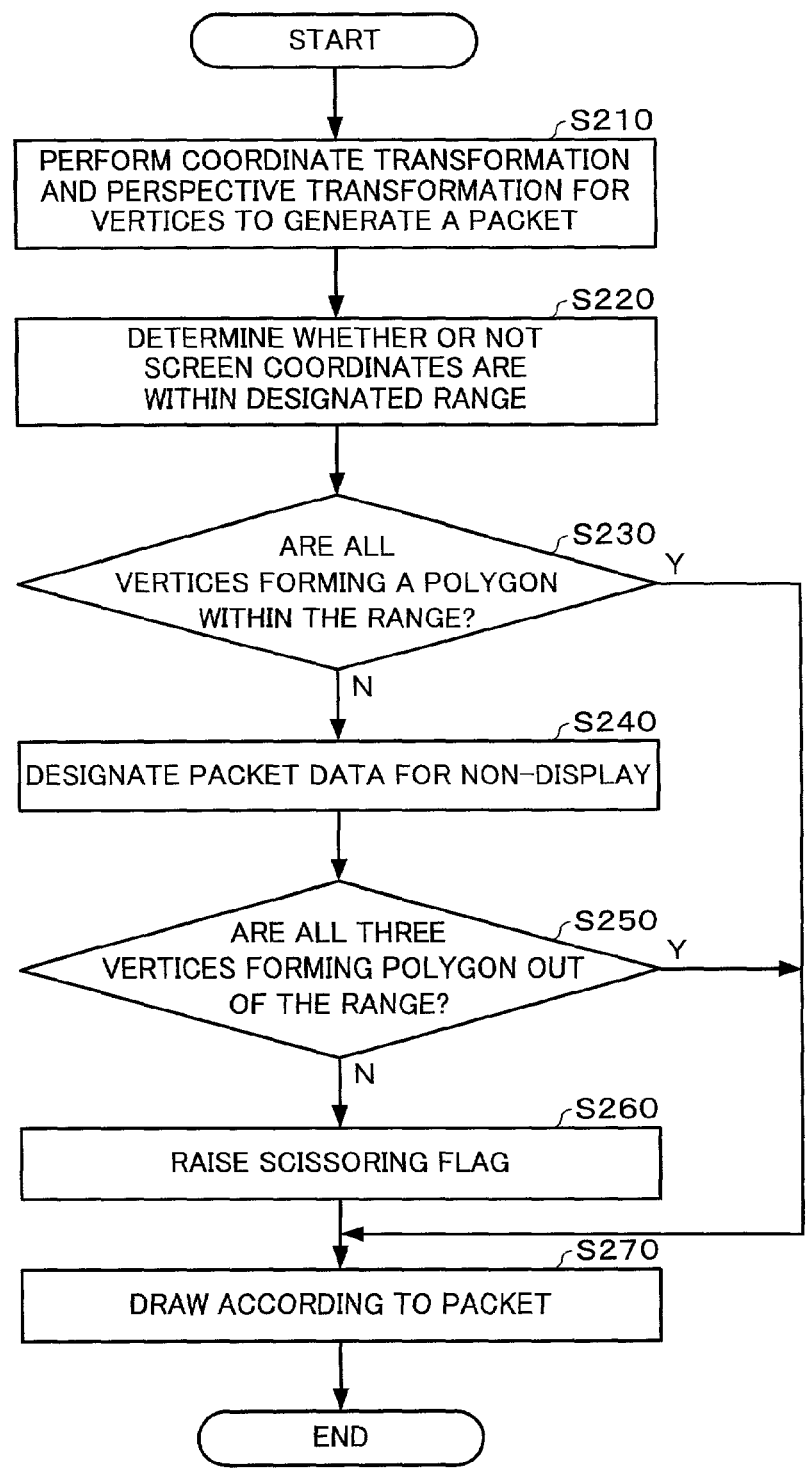
FIG. 8 is a flowchart of a concrete example of the processing for the scissoring and drawing.

FIG. 7 and FIG. 8 are charts for describing specific processing examples of the scissoring and drawing processing.

First of all, a selection for scissoring processing is executed to reduce polygons to be scissored (step S110). This selection reduces scissoring processing as well as computation load. Here is raised a scissoring flag for the polygons to be scissored. Then, the processing of step S110 is repeated till the processing of all the vertices of each strip or polygon are ended (step S120). Note that each strip has a data structure for making continuous triangles sharing sides.

On the polygon having the scissoring flag raised, there is made a list of vertex forming the original triangle (or polygon) (steps S130 and S140). This vertex list contains information necessary for generating images such as vertex coordinates, or texture coordinates corresponding to vertices.

Then, scissoring is carried out for each side surface of the quadrangular pyramid forming a view volume and a new vertex list is made to perform drawing after a packet is made (step S150). Note that a packet contains information necessary for generating images, such as information in a vertex list, so that the image drawing section executes the drawing processing on the basis of the packet.

For the polygon having no scissoring flag raised, drawing processing is performed on the basis of a packet which has already been generated in the selection for scissoring processing (step S170).

The steps 130 to S160 are repeated until all vertices of each strip or polygon are processed (step S170).

The steps S100 to S180 are repeated until all strips are processed (step S180).

FIG. 8 is a flowchart for describing a processing example of the selection for scissoring processing.

First of all, vertices are subjected to coordinate transformation and perspective transformation to make a packet (step S210). Note that a packet contains information necessary for image generation, such as information in a vertex list, and the image drawing section executes the drawing processing on the basis of the packet.

Then whether or not screen coordinates of a vertex are within a designated range (step S220).

If part or all of three vertices forming a polygon are not within the range, packet data is designated for non-display (step S240). With this designation, the drawing data are not displayed.

If part of three vertices of a polygon are within the range, a scissoring flag is raised (steps S250 and S260).

If all three vertices forming a polygon are within the range, designation for non-display and raise of scissoring flag are not required, so that the steps S240 to S260 are skipped (step S230). If all the three vertices forming a polygon are out of the range, there is no probability of the display failure, so that the step S260 is skipped.

Then, the drawing is executed according to the packet (step S270).

3. Three-Dimensional Scissoring Processing

As has been described in FIG. 3, the embodiment is constructed such that the scissoring processing is executed by using the four side faces of the quadrangular pyramid composing the view volume, as the scissoring plane.

A specific example of the three-dimensional scissoring processing will be described with reference to FIG. 9A to FIG. 16.

Figure 9A:
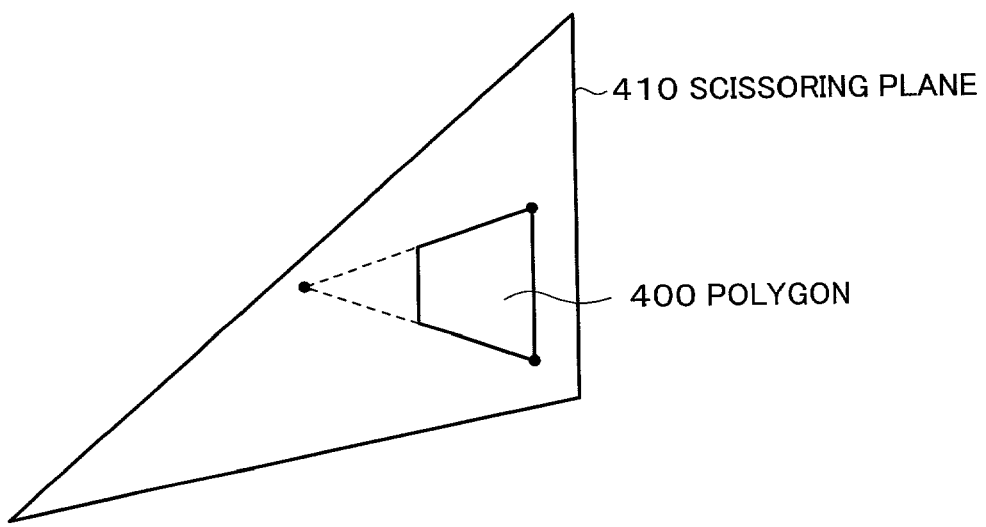
FIGS. 9A and 9B are diagrams for illustrating concrete examples of the processing for a three-dimensional scissoring of one embodiment of the present invention.
Figure 9B:
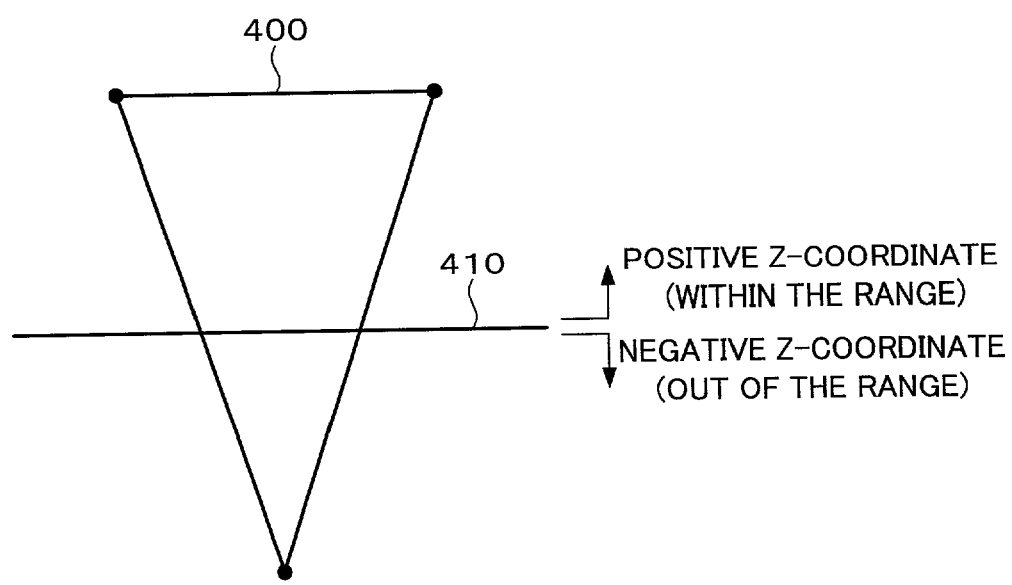

If a polygon 400 of FIG. 9A is to be scissored with a scissoring plane 410, for example, the coordinate transformations have to be so made that the scissoring plane may be an XY plane. Then, part of the polygon 400 having a positive Z-coordinate is within the range, and part of the polygon 400 having a negative Z-coordinate is out of the range, as shown in FIG. 9B. With these coordinate transformations, the following scissoring computation can be simplified to lighten the computation load.

Figure 10:
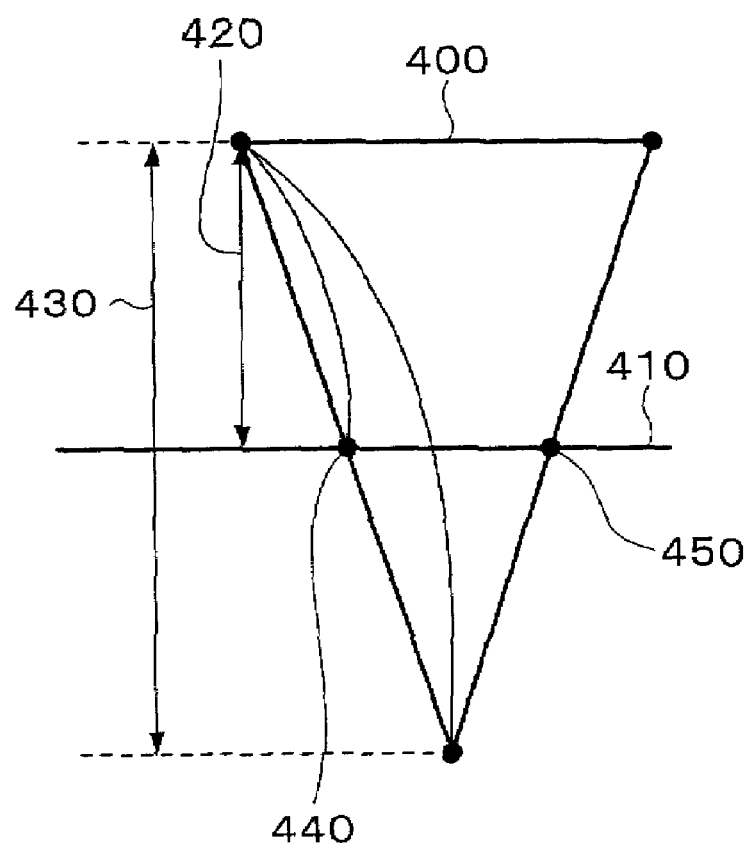
FIG. 10 is a diagram for illustrating an example of the computation for vertex coordinates when a new vertex is generated by scissoring a portion of a polygon out of the range in a scissoring plane.

FIG. 10 is a diagram for describing a computation example of the vertex coordinates of the case in which the portion outside of the range of the polygon 400 is scissored in the scissoring plane 410 to generate new vertices 440 and 450. The coordinate transformations are made so that the scissoring plane 410 may be the XY plane, as described hereinbefore. Therefore, a division coefficient is determined from the difference between Z-coordinates 420 and 430 so that the vertex coordinates after the division can be simply determined by using the division coefficient.

Figure 11:
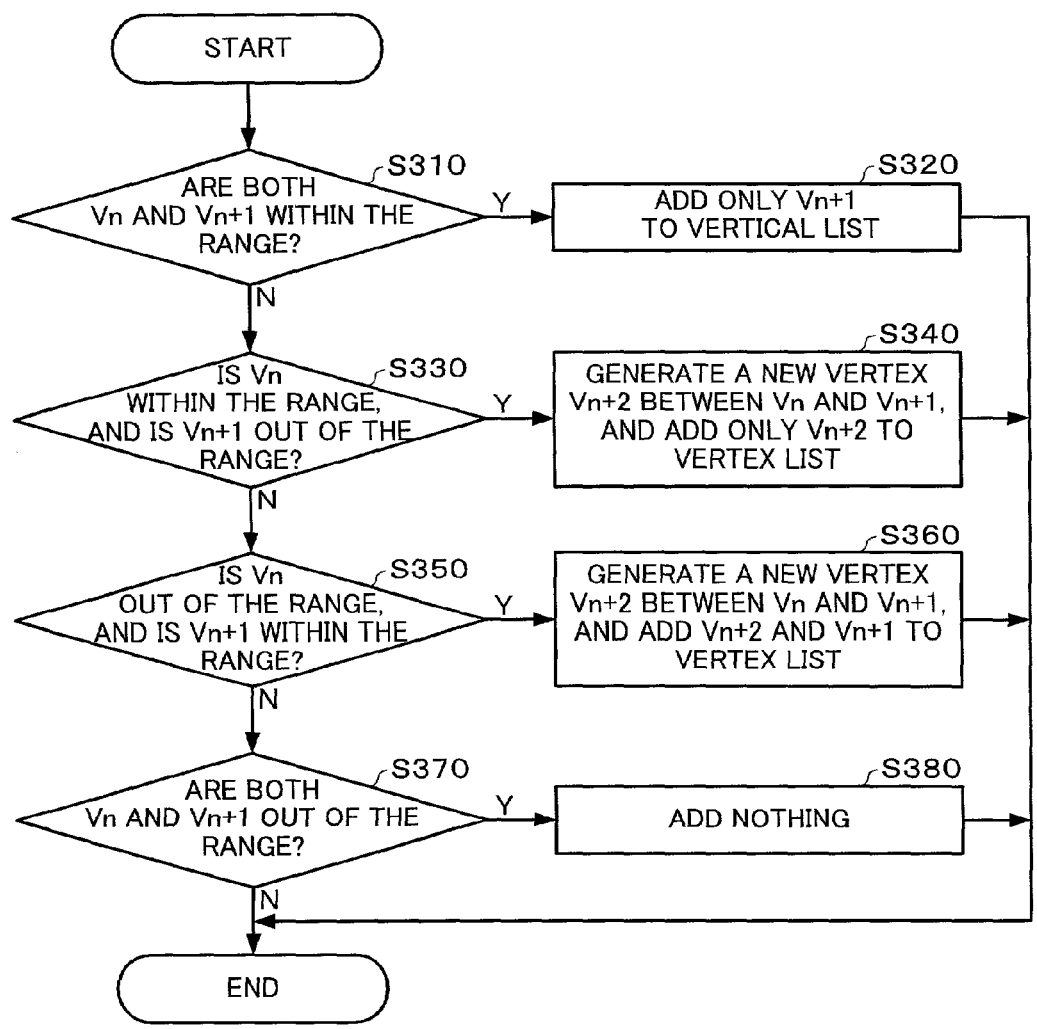
FIG. 11 is a flowchart for describing a basic concept of the generation of a new vertex by scissoring a side connecting vertices Vn and Vn+1.

FIG. 11 is a flow chart for describing the basic concept of scissoring a side connecting vertices $V_n$ and $V_{n+1}$ and generating a new vertex.

If both the vertices $V_n$ and $V_{n+1}$ are within the range, only the vertex $V_{n+1}$ is added to the vertex list (steps S310 and S320).

If the vertex $V_n$ is within the range but the vertex $V_{n+1}$ is out of the range, a new vertex $V_{n+2}$ is generated between $V_n$ and $V_{n+1}$, and only the vertex $V_{n+2}$ is added to the vertex list (steps S330 and S340).

If the vertex $V_n$ is out of the range but the vertex $V_{n+1}$ is within the range, a new vertex $V_{n+2}$ is generated between $V_n$ and $V_{n+1}$, and the vertices $V_{n+2}$ and $V_{n+1}$ are added to the vertex list (steps S350 and S360).

If both the vertices $V_n$ and $V_{n+1}$ are out of the range, nothing is added to the vertex list (steps S370 and S380).

The processing is executed for all the sides of the polygon face to be scissored.

Here will be described an example of scissoring and generating vertices, by taking an example in which new vertices are generated by scissoring one polygon surface sequentially in four scissoring planes.

Figure 12:
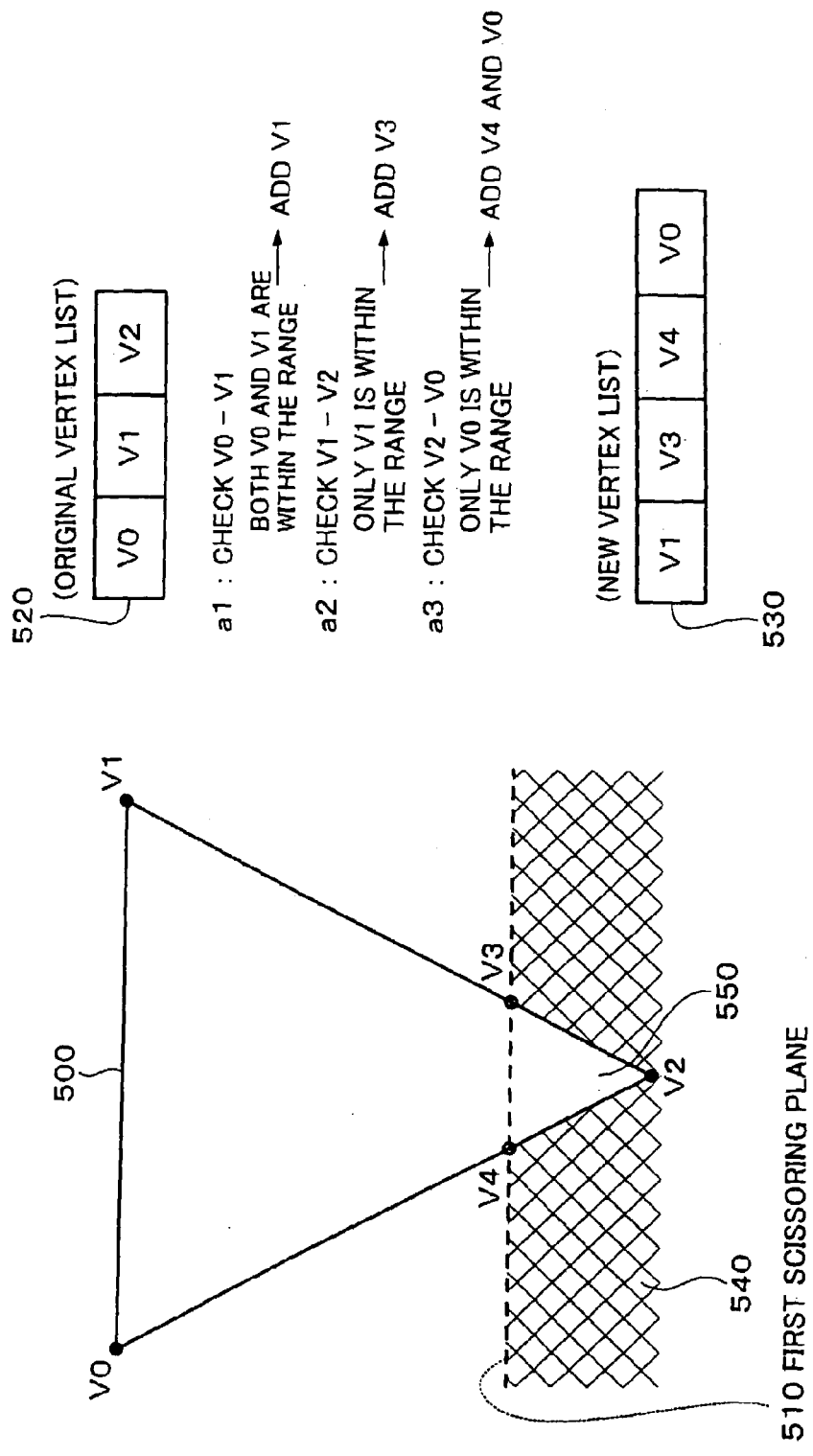
FIG. 12 is a diagram for illustrating the generation of a new vertex by scissoring a triangle in a first scissoring plane.

FIG. 12 is a diagram for describing the behavior in which a new vertex is generated by scissoring a triangle 500 in a first scissoring plane 510. The coordinate transformations are made so that the first scissoring plane 510 may be the XY plane, as has been described with reference to FIGS. 9a and 9B.

In an original vertex list 520, there are listed up vertices V0, V1 and V2 of the polygon 500 before scissored. The vertex list is stored with not only the vertex numbers but also information necessary for the drawing such as vertex coordinates or texture coordinates corresponding to vertices, but the description is omitted.

A hatched portion 540 on the lower side of the first scissoring plane 510 is a portion to be scissored off (or out of the range). In accordance with the order of the vertex numbers listed up in the original vertex list 520, the individual sides having those vertices as the starting points and the ending points are subjected to the processing shown by a1 to a3 according to the algorithm in the flow chart of FIG. 11, to generate a new vertex list 530. By the processing shown by a1 to a3, new vertices V3 and V4 are generated, and a portion 550 containing the vertex V2 which is out of the range is scissored off.

Figure 13:
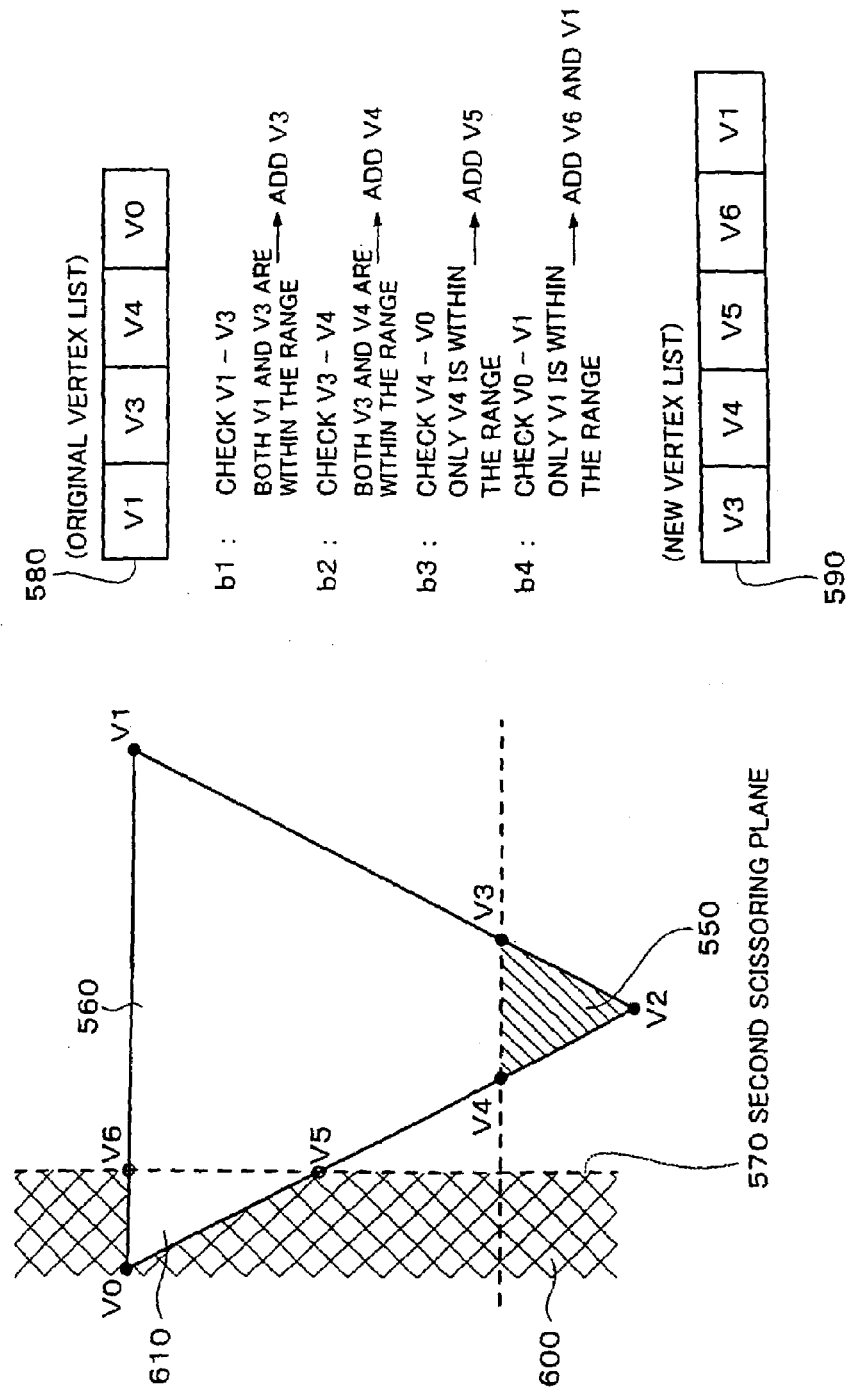
FIG. 13 is a diagram for illustrating the generation of a new vertex by scissoring a quadrangle created by the preceding scissoring in the first scissoring plane, in a second scissoring plane.

FIG. 13 is a diagram for describing the behavior in which a new vertex is generated by scissoring a quadrangle 560, as scissored out in the first scissoring plane, in a second scissoring plane 570. The coordinate transformations are made so that the second scissoring plane 570 may be the XY plane, as has been described with reference to FIGS. 9a and 9B.

The hatched portion 550 is the portion which is scissored out in the first scissoring plane. In an original vertex list 580, therefore, there are listed up the vertices V1, V3, V4 and V0 of the quadrangle 560.

A hatched portion 600 on the lefthand side of the second scissoring plane 570 is a portion to be scissored off (or out of the range). In accordance with the order of the vertex numbers listed up in the original vertex list 580, the individual sides having those vertices as the starting points and the ending points are subjected to the processing shown by b1 to b4 according to the algorithm in the flow chart of FIG. 11, to generate a new vertex list 590. By the processing shown by b1 to b4, new vertices V5 and V6 are generated, and a portion 610 containing the vertex V0 which is out of the range is scissored off.

Figure 14:
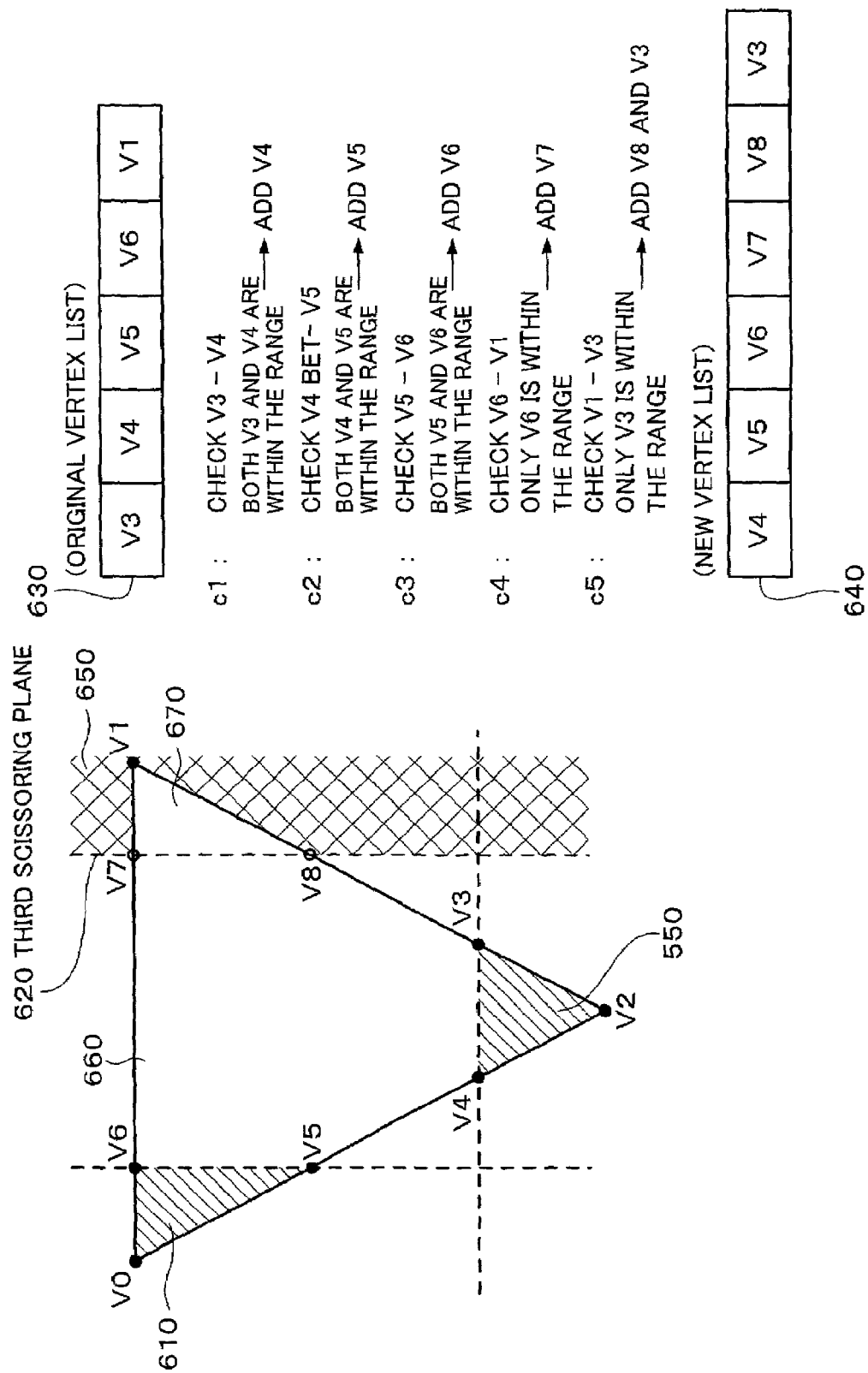
FIG. 14 is a diagram for illustrating the generation of a new vertex by scissoring a pentagon created by the preceding scissoring in the first and second scissoring planes, in a third scissoring plane.

FIG. 14 is a diagram for describing the behavior in which a new vertex is generated by scissoring a pentagon 660, as scissored out in the first and second scissoring planes, in a third scissoring plane 620. The coordinate transformations are made so that the third scissoring plane 620 may be the XY plane, as has been described with reference to FIGS. 9A and 9B.

The hatched portions 550 and 610 are the portions which are scissored out in the first and second scissoring planes. In an original vertex list 630, therefore, there are listed up the vertices V3, V4, V5, V6 and V1 of the pentagon 660.

A hatched portion 650 on the righthand side of the third scissoring plane 620 is a portion to be scissored off (or out of the range). In accordance with the order of the vertex numbers listed up in the original vertex list 630, the individual sides having those vertices as the starting points and the ending points are subjected to the processing shown by c1 to c5 according to the algorithm in the flow chart of FIG. 11, to generate a new vertex list 640. By the processing shown by c1 to c5, new vertices V7 and V8 are generated, and a portion 670 containing the vertex V1 which is out of the range is scissored off.

FIG. 15 is a diagram for describing the behavior in which a new vertex is generated by scissoring a hexagon 680, as scissored out in the first, second and third scissoring planes, in a fourth scissoring plane 690. The coordinate transformations are made so that the fourth scissoring plane 690 may be the XY plane, as has been described with reference to FIGS. 9A and 9B.

The hatched portions 550, 610 and 670 are the portions which are scissored out in the first, second and third scissoring planes. In an original vertex list 710, therefore, there are listed up the vertices V4, V5, V6, V7, V8 and V3 of the hexagon 680.

A hatched portion 690 on the lower side of the fourth scissoring plane 690 is a portion to be scissored off (or out of the range). In accordance with the order of the vertex numbers listed up in the original vertex list 710, the individual sides having those vertices as the starting points and the ending points are subjected to the processing shown by d1 to d6 according to the algorithm in the flow chart of FIG. 11, to generate a new vertex list 720. By the processing shown by d1 to d6, new vertices V9 and V10 are generated, and a portion 730 containing the vertices V3 and V4 which are out of the range is scissored off.

On the basis of this new vertex list 720, the packet data of the polygon after scissored are generated.

Figure 16:
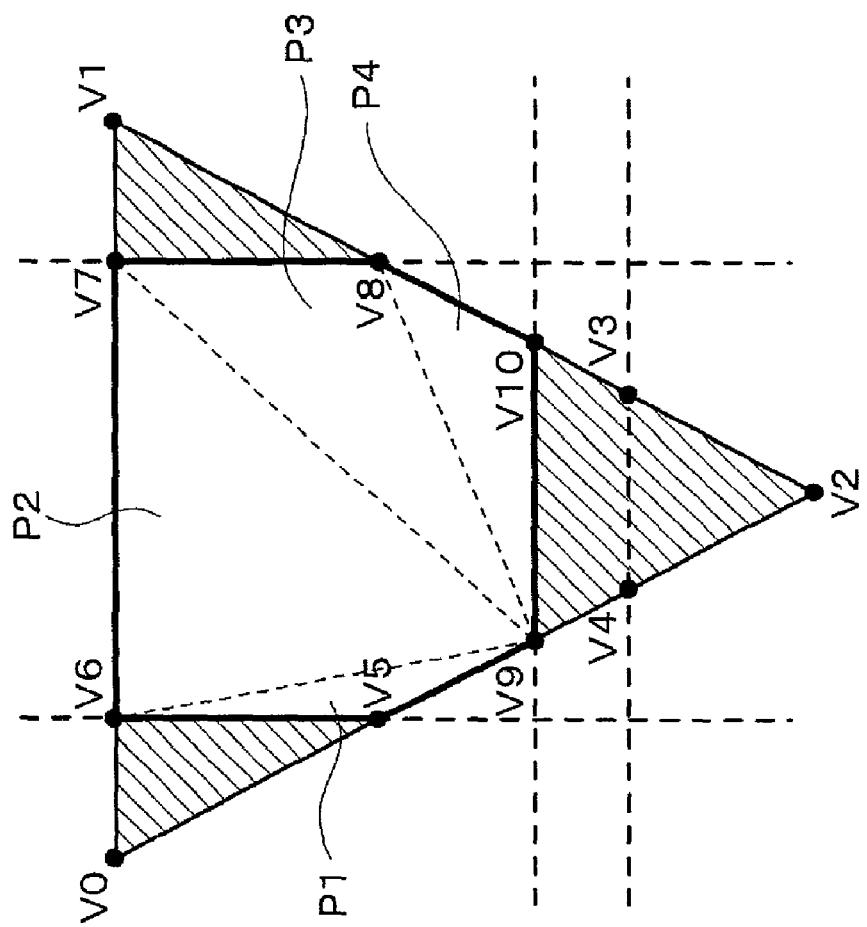
FIG. 16 shows a polygon after the scissoring.

FIG. 16 shows a behavior of the polygon after scissored. In the embodiment, the image is generated by using triangular polygons, and what is generated by the scissoring is a hexagon so that four polygons P1 to P4 are drawn by the triangle fan method.

4. Hardware Configuration

Figure 17:
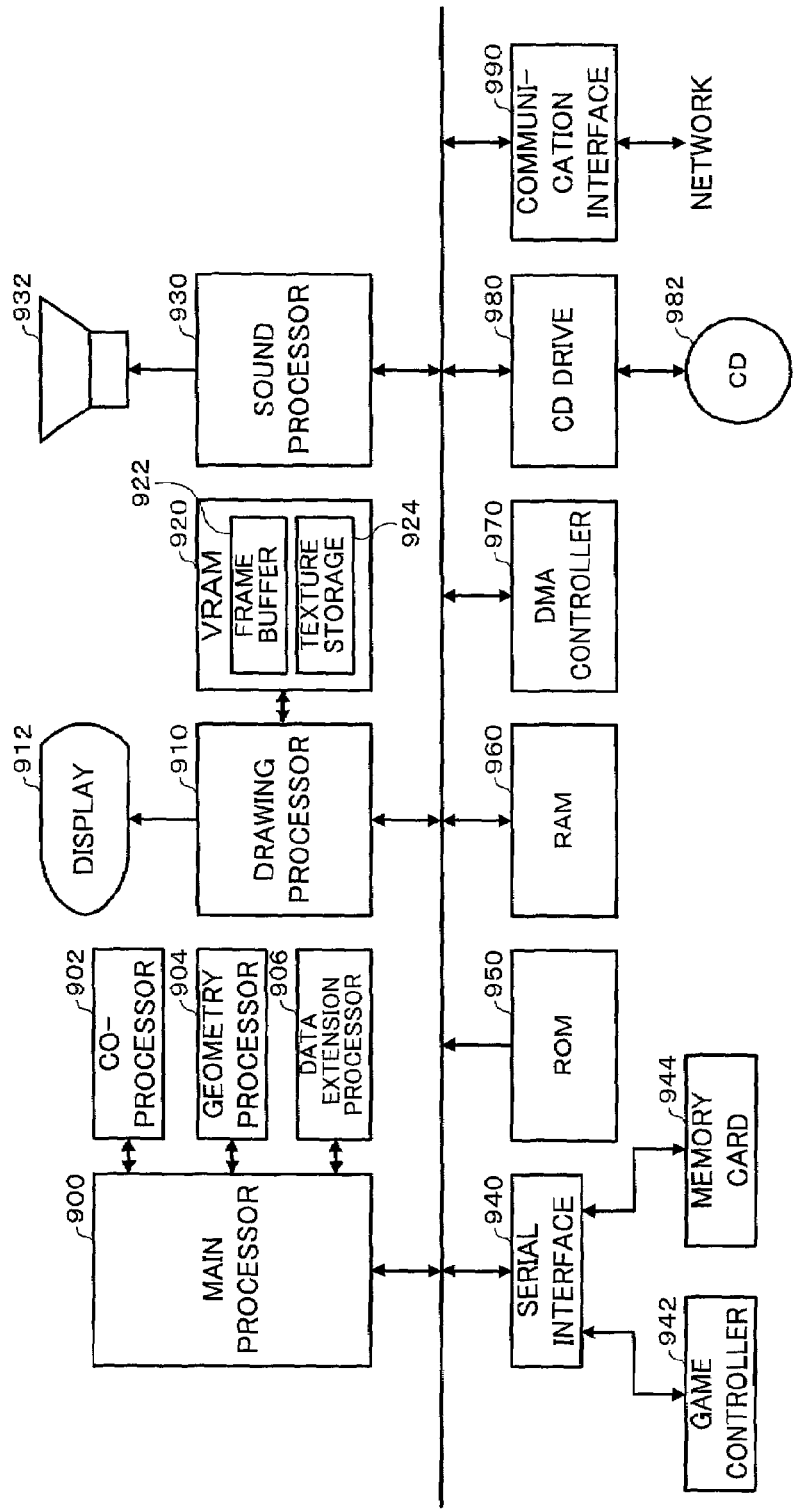
FIG. 17 is a diagram showing an example of hardware configuration for implementing one embodiment of the present invention.

Next, one example of the configuration of a hardware capable of implementing the embodiment will be described with reference to FIG. 17.

A main processor 900 operates according to programs stored in a CD 982 (or information storage medium), programs transferred through a communication interface 990 or programs stored in a ROM 950 (i.e., a kind of information storage means), to execute processing such as the game processing, the image processing or the sound processing.

A coprocessor 902 assists the processing of the main processor 900 and has a product summing section or a dividing section which can perform quick parallel operations so that it executes matrix operations (or vector operations) quickly. If the processing such as the matrix operation is necessary for the physical simulation for object movement or operation (or motion), for example, the programs acting over the main processor 900 designate (or requests) the coprocessor 902 for the processing.

A geometry processor 904 executes geometry processing such as coordinate transformation, perspective transformation, light source calculation and curve generation, and has a product summing section or a dividing section which can perform quick parallel operations so that it executes matrix operations (or vector operations) quickly. If the processing such as coordinate transformation, perspective transformation or light source calculation is to be executed, for example, the programs acting the main processor 900 designate the geometry processor 904 for the processing.

A data extension processor 906 executes the decoding processing to extend compressed image data or sound data or processing to accelerate decoding processing of the main processor 900. As a result, motion images, as compressed by the MPEG method or the like, can be displayed in the opening screen, the intermission screen, the ending screen or the game screen. Note that the image data or the sound data to be decoded are stored in the ROM 950 or the CD 982 or transferred from the outside through the communication interface 990.

A drawing processor 910 is provided for quickly executing the drawing (or rendering) processing of the object which is composed of primitive faces such as polygons or curved faces. At the time of drawing the object, the main processor 900 makes use of the functions of a DMA controller 970 to deliver the object data to the drawing processor 910 and, if necessary, to transfer the texture to a texture storage section 924. Then, the drawing processor 910 draws the object quickly on a frame buffer 922 while performing a shadow face erasure by using a Z-buffer on the basis of those object data or texture. The drawing processor 910 can also perform the α-blending (or semitransparent processing), the MIP mapping, the fogging processing, the trilinear filtering, the antialiasing, and the shading processing. Moreover, an image of one frame is displayed, when written in the frame buffer 922, in a display 912.

A sound processor 930 has a multi-channel ADPCM sound source packaged therein to generate game sounds of high quality such as BGM, effective sounds or voices. The game sounds thus generated are outputted from a speaker 932.

The operating data from a game controller 942 and the save data and personal data from a memory card 944 are transferred through a serial interface 940.

The ROM 950 is stored with the system programs or the like. Here in the case of arcade game systems, the ROM 950 functions as the information storage medium so that the ROM 950 is stored with the various programs. Note that the ROM 950 may be replaced by a hard disk.

A RAM 960 is used as the working area for the various processors.

The DMA controller 970 controls the DMA transfers between the processor and the memory (e.g., RAM, VRAM or ROM).

A CD drive 980 drives the CD 982 (or information storage medium) stored with the programs, image data or sound data and enables these programs or data to be accessed to.

The communication interface 990 is an interface for transferring the data with the outside through a network. As the network connected to the communication interface 990, here can be conceived the communication lines (e.g., analog telephone lines or ISDN) or the bus of the high-speed serial interface. By using the communication lines, moreover, the data transfer through the internet can be achieved. By using the bus of the high-speed serial interface, the data transfer can be made with another image generating system, another game system, the household electric appliances (e.g., video decks or video cameras), or the information processing device (e.g., the personal computer, printer, mouse or keyboard).

The individual means of the invention may be wholly executed exclusively either by the hardware or by the programs stored in the information storage medium or the programs distributed through the communication interface. Alternatively, the execution may be effected by both the hardware or the programs.

If the individual means of the invention are to be executed by both the hardware and the programs, the information storage medium is stored with the programs (i.e., the programs and data) for executing the individual means of the invention by making use of the hardware. More specifically, the aforementioned programs designate the hardware, i.e., the individual processors 902, 904, 906, 910, 930 and so on for the processing, and transfer the data, if necessary, to them. Then, the individual processors 902, 904, 906, 910, 930 and so on execute the individual means of the invention on the basis of the designations and the transferred data.

Figure 18A:
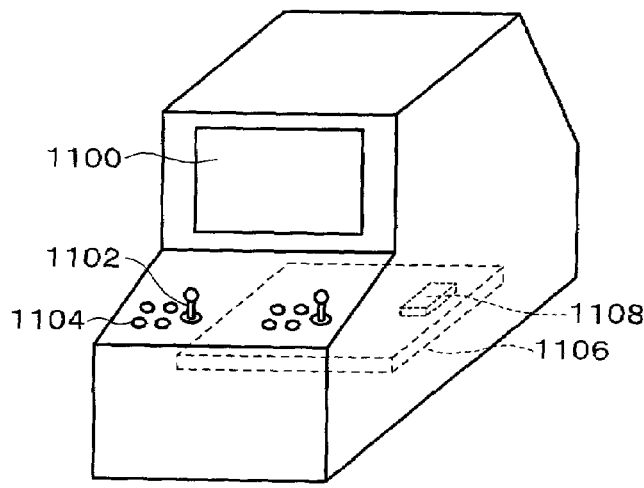
FIGS. 18A to 18C show various examples of systems to which one embodiment of the present invention is applied.

An example of this embodiment applied to an arcade game system is shown in FIG. 18A. The player enjoys the game by manipulating a lever 1102, buttons 1104 and so on while observing the game image projected on a display 1100. Various processors and memories are mounted on an internal system board (or circuit board) 1106. A program (or program and data) for executing the means of the present invention is stored in a memory 1108 which is the information storage medium on the system board 1106. This information is hereinafter called stored information.

Figure 18B:
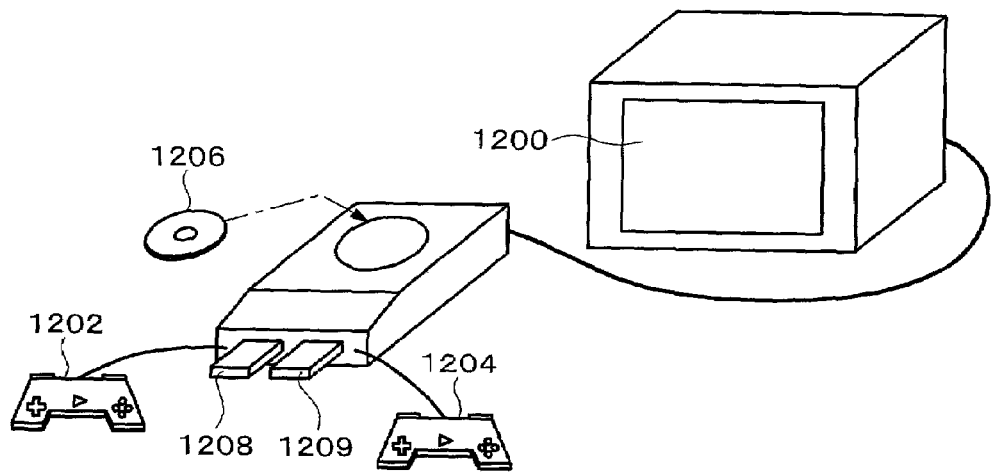

FIG. 18B shows an example of the case in which the embodiment is applied to a domestic game system. The player enjoys the game by manipulating game controllers 1202 and 1204 while observing the game image projected on a display 1200. In this case, the aforementioned stored information is stored in either a CD 1206 the information storage medium to be removably attached to the body system or memory cards 1208, 1209 and so on.

Figure 18C:
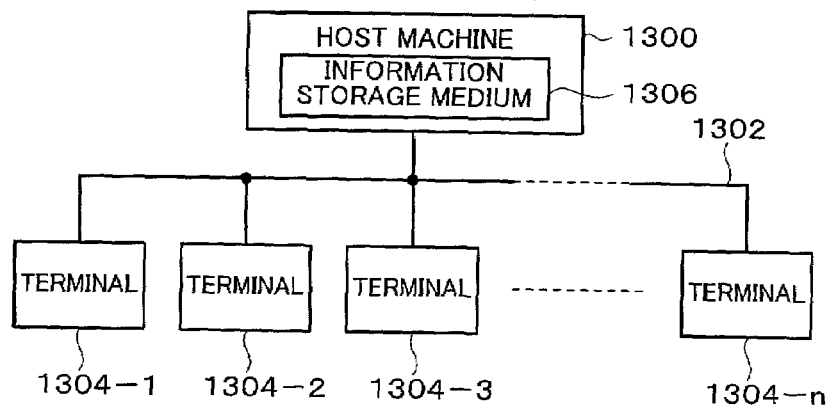

FIG. 18C shows an example of this embodiment applied to a system including a host machine 1300 and terminals 1304-1 to 1304-*n* connected to the host machine 1300 through a network 1302 (e.g., a small-scale network such as a LAN, or a wide ranging network such as the Internet). In this case, the stored information is stored in an information storage medium 1306 such as a magnetic disk, magnetic tape, or memory that can be controlled by the host machine 1300. If each of the terminals 1304-1 to 1304-*n* can generate game images and sounds in a stand-alone manner, means such as game program for generating game images and sounds is transferred to the terminals 1304-1 to 1304-*n* from the host machine 1300. On the other hand, if game images and sounds cannot be generated in a stand-alone manner, the host machine 1300 creates the game images and sounds and transfers them to the terminals 1304-1 to 1304-*n* for output by those terminals.

In the configuration shown in FIG. 18C, the execution of the means of the present invention may be divided between the host machine (or server) and the terminals. Similarly, the aforementioned stored information for executing the means of the present invention may be divided between the information storage medium on the host machine (or server) and the information storage media of the terminals.

In addition, the terminals connected by the network could be either domestic game systems or arcade game systems. If arcade game systems are connected by the network, it is preferable to use portable information storage devices (e.g., memory cards or hand-held game devices) capable of exchanging information with arcade game systems and also exchanging with domestic game systems.

Note that this invention is not limited to the above described embodiments and thus it can be implemented in various other ways.

For example, the invention according to the dependent claim can also be constructed by omitting a portion of the components of the dependent claim. The essential portion of the invention according to an independent claim can be made to depend upon another independent claim.

For example, the embodiment has been described on the case, in which the scissoring processing is executed to prevent the display failure of the polygon, but the invention should not be limited thereto. For example, the embodiment may be used for a production to scissor off the object.

The specific method for generating a new vertex in the scissoring processing should not be limited to that which has been described in connection with the embodiment.

The present invention can be applied not only to the racing game but also to various other games (such as battle games, shooting games, robot battle games, sports games, racing games, role-playing games, music playing games and dance games).

Moreover, the present invention can be applied to various image generating systems such as arcade game system, domestic game systems, large-scale attraction systems in which many players can participate, simulators, multimedia terminals, image generating systems, and system boards for generating game images.

What is claimed is:

1. An image generating system which generates a three-dimensional image, comprising:
   means which extracts at least one block subject for scissoring near a view point in a three-dimensional space which is subject to coordinate transformation into a screen coordinate system;
   means which detects a vertex of an object formed of a polygon in the at least one block, the vertex being out of a drawable range;
   means which scissors the polygon to generate a new vertex for specifying the scissored polygon; and
   means which generates the image of the object formed of the polygon containing the new vertex,
   wherein detecting a vertex which is out of a drawable range in a polygon is performed prior to scissoring the polygon.

2. The image generating system as defined in claim 1, wherein a polygon containing a vertex which is out of a drawable range is scissored at a portion containing the vertex, in a predetermined plane.

3. The image generating system as defined in claim 1, wherein a polygon is scissored in a plane which specifies a viewing angle range.

4. The image generating system as defined in claim 2, wherein a polygon is scissored in a plane which specifies a viewing angle range.

5. The image generating system as defined in claim 1, wherein a polygon arranged in a three-dimensional space is subjected to coordinate transformation into a screen coordinate system, to detect an undrawable vertex; and
   wherein the polygon containing the detected vertex is scissored at a portion containing the detected vertex in a predetermined plane.

6. The image generating system as defined in claim 2, wherein a polygon arranged in a three-dimensional space is subjected to coordinate transformation into a screen coordinate system, to detect an undrawable vertex; and
   wherein the polygon containing the detected vertex is scissored at a portion containing the detected vertex in a predetermined plane.

7. The image generating system as defined in claim 3, wherein a polygon arranged in a three-dimensional space is subjected to coordinate transformation into a screen coordinate system, to detect an undrawable vertex; and
   wherein the polygon containing the detected vertex is scissored at a portion containing the detected vertex in a predetermined plane.

8. The image generating system as defined in claim 4, wherein a polygon arranged in a three-dimensional space is subjected to coordinate transformation into a screen coordinate system, to detect an undrawable vertex; and
   wherein the polygon containing the detected vertex is scissored at a portion containing the detected vertex in a predetermined plane.

9. The image generation system as defined in claim 1, further comprising means which extracts at least one block subject for clipping, wherein the at least one block subject for clipping includes the at least one block subject for scissoring.

10. A computer-usable program embodied on an information storage medium or in a carrier wave, comprising a program for implementing:
    means which extracts at least one block subject for scissoring near a view point in a three-dimensional space which is subject to coordinate transformation into a screen coordinate system;
    means which detects a vertex of an image formed of a polygon in the at least one block, the vertex being out of a drawable range;
    means which scissors the polygon to generate a new vertex for specifying the scissored polygon; and
    means which generates an image of an object formed of a polygon containing the new vertex;
    wherein detecting a vertex which is out of a drawable range in a polygon is performed prior to scissoring the polygon.

11. The program embodied on an information storage medium or in a carrier wave as defined in claim 10, wherein a polygon containing a vertex which is out of a drawable range is scissored at a portion containing the vertex, in a predetermined plane.

12. The program embodied on an information storage medium or in a carrier wave as defined in claim 10, wherein a polygon is scissored in a plane which specifies a viewing angle range.

13. The program embodied on an information storage medium or in a carrier wave as defined in claim 11, wherein a polygon is scissored in a plane which specifies a viewing angle range.

14. The program embodied on an information storage medium or in a carrier wave as defined in claim 10, wherein a polygon arranged in a three-dimensional space is subjected to coordinate transformation into a screen coordinate system, to detect an undrawable vertex; and
    wherein the polygon containing the detected vertex is scissored at a portion containing the detected vertex in a predetermined plane.

15. The program embodied on an information storage medium or in a carrier wave as defined in claim 11, wherein a polygon arranged in a three-dimensional space is subjected to coordinate transformation into a screen coordinate system, to detect an undrawable vertex; and wherein the polygon containing the detected vertex is scissored at a portion containing the detected vertex in a predetermined plane.

16. The program embodied on an information storage medium or in a carrier wave as defined in claim 12,
wherein a polygon arranged in a three-dimensional space is subjected to coordinate transformation into a screen coordinate system, to detect an undrawable vertex; and
wherein the polygon containing the detected vertex is scissored at a portion containing the detected vertex in a predetermined plane.

17. The program embodied on an information storage medium or in a carrier wave as defined in claim 13, wherein a polygon arranged in a three-dimensional space is subjected to coordinate transformation into a screen coordinate system, to detect an undrawable vertex; and
wherein the polygon containing the detected vertex is scissored at a portion containing the detected vertex in a predetermined plane.

18. The image generation system as defined in claim 10, further comprising means which extracts at least one block subject for clipping, wherein the at least one block subject for clipping includes the at least one block subject for scissoring.

* * * * *

UNITED STATES PATENT AND TRADEMARK OFFICE
CERTIFICATE OF CORRECTION

| | | |
|---|---|---|
| PATENT NO. | : 7,106,324 B1 | Page 1 of 1 |
| APPLICATION NO. | : 09/830356 | |
| DATED | : September 12, 2006 | |
| INVENTOR(S) | : Kazuya Takahashi | |

It is certified that error appears in the above-identified patent and that said Letters Patent is hereby corrected as shown below:

On the title page Item 75 (Inventors): change "Ota-ku" to --Yokohama-shi--;

Signed and Sealed this

Ninth Day of January, 2007

JON W. DUDAS
*Director of the United States Patent and Trademark Office*